(No Model.)
M. A. CROSSMAN.
APPARATUS FOR HOLDING HORSES WHILE BEING SHOD.
No. 472,917. Patented Apr. 12, 1892.
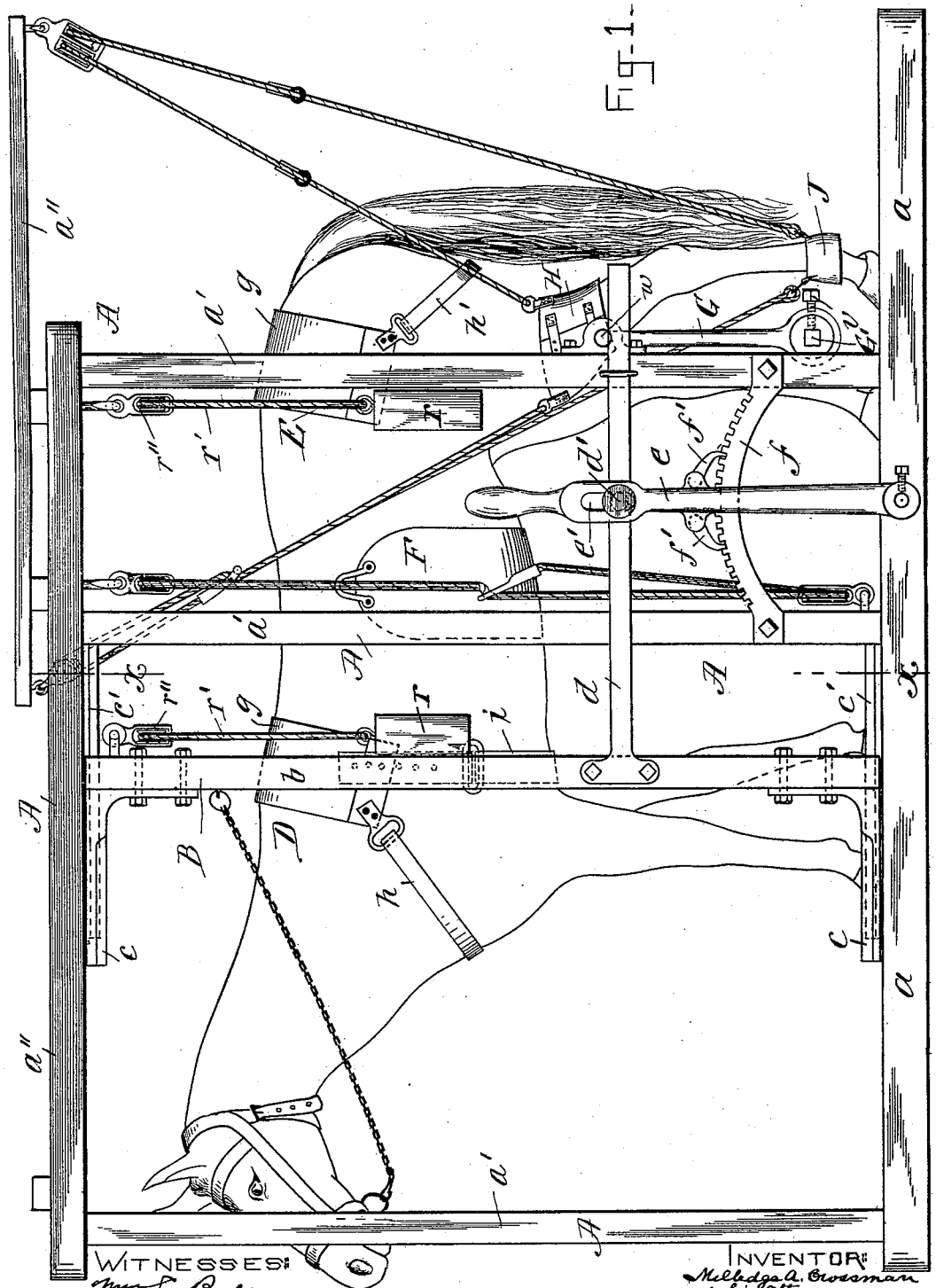

(No Model.) 3 Sheets—Sheet 2.
M. A. CROSSMAN.
APPARATUS FOR HOLDING HORSES WHILE BEING SHOD.
No. 472,917. Patented Apr. 12, 1892.
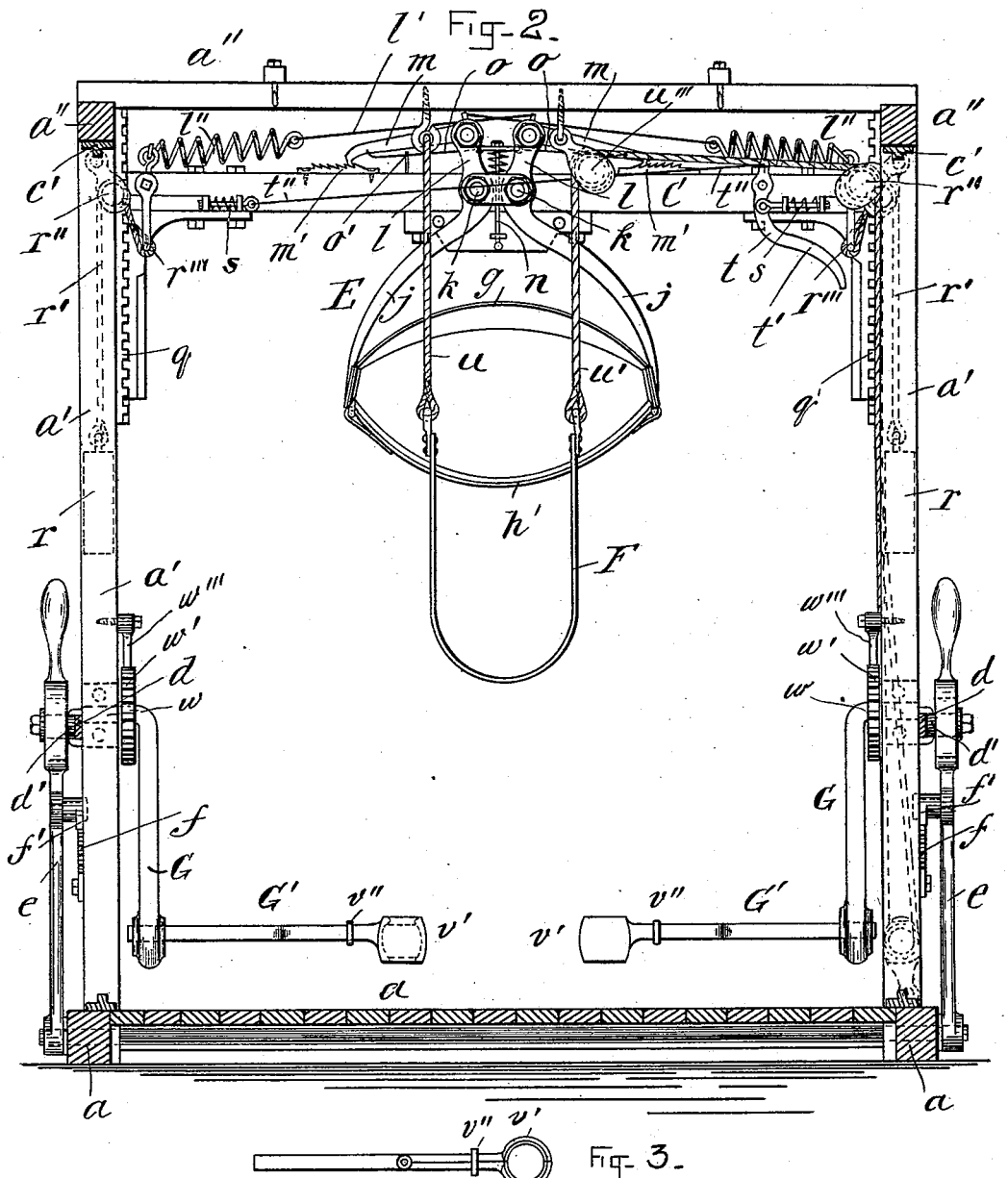
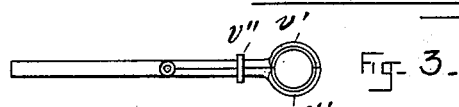
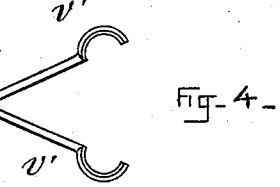
WITNESSES:
INVENTOR:
Milledge A. Crossman
by his Attorneys
Brown Bros (No Model.) 3 Sheets—Sheet 3.
M. A. CROSSMAN.
APPARATUS FOR HOLDING HORSES WHILE BEING SHOD.
No. 472,917. Patented Apr. 12, 1892.
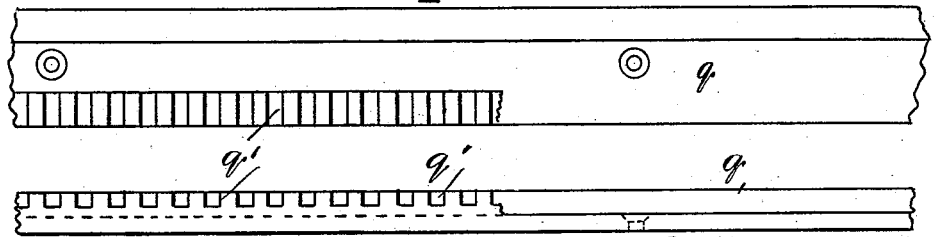
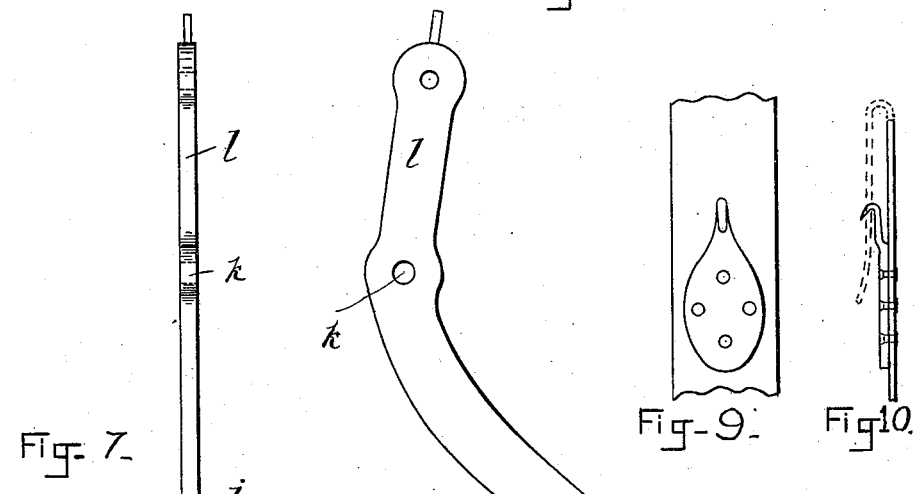
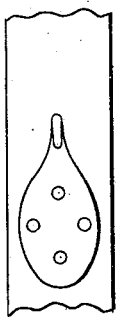
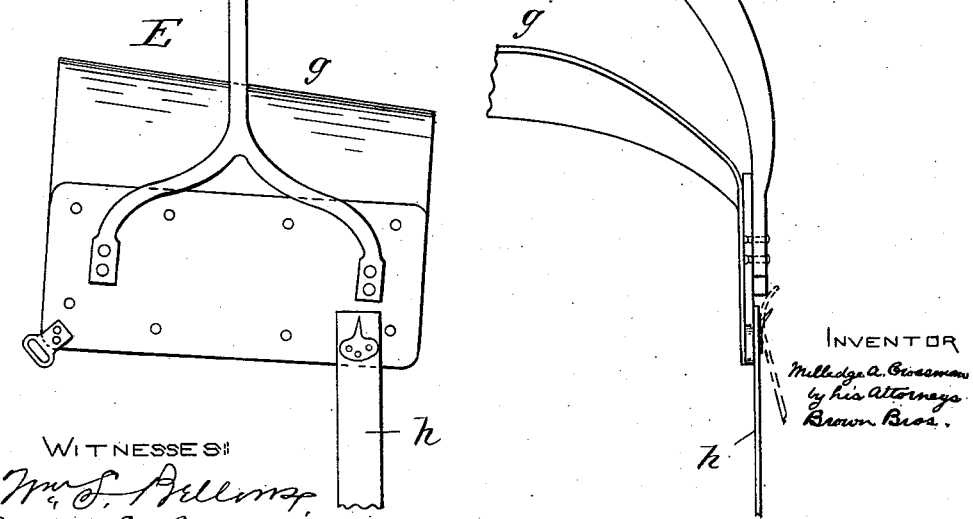

UNITED STATES PATENT OFFICE.

MILLEDGE A. CROSSMAN, OF HYDE PARK, ASSIGNOR OF ONE-HALF TO GEORGE W. EMERSON, OF BOSTON, MASSACHUSETTS.

APPARATUS FOR HOLDING HORSES WHILE BEING SHOD.

SPECIFICATION forming part of Letters Patent No. 472,917, dated April 12, 1892.

Application filed February 17, 1891. Serial No. 381,766. (No model.)

*To all whom it may concern:*

Be it known that I, MILLEDGE A. CROSSMAN, a citizen of the United States, and a resident of the town of Hyde Park, in the county of Norfolk and State of Massachusetts, have invented an Improved Apparatus for Holding Horses while being Shod, of which the following is a full, clear, and exact description.

This invention relates to improvements in horse-holders or apparatus for use in the shoeing or otherwise working upon horses or other animals, whereby the animal will be confined against any movement bodily, or, if desired, against movement by any of his members, so that the work of shoeing or clipping or other operation, as the case may be, may be most expeditiously and safely performed. Due to the use of the present improved contrivances the horse may be so confined that he will be incapable of wrenching, bruising, or injuring himself, and most unruly horses may be controlled with the utmost facility.

The invention, broadly considered, consists, in an apparatus for the purpose indicated, in the combination of a suitable supporting structure having thereon appliances for confining one portion of the animal and a support also carrying appliances for the confinement of another portion of the animal, and both adapted to be moved lengthwise, as to and on each other, and thereby as a complete structure lengthened or shortened, as found necessary, to suit the length of the animal.

The invention also consists in the combination, with confining appliances for engaging or encircling the hind portion of the animal's body and another for encircling the fore portion thereof, one of said appliances being movable substantially horizontally toward and from the other, of a carrier for supporting and vertically moving each of said confining appliances respectively provided therefor.

The invention also consists in the combination, with a suitable supporting structure, of appliances thereon for encircling and confining the animal as to the fore and hind portions of his body and an intermediate one for the support and confinement of the middle of the body, each of said confining appliances being vertically adjustable on its support, and one of the said outermost confining appliances being suitably independently movable toward and from the other outer confining appliance.

The invention further consists in various other combinations and arrangements of parts or instrumentalities, substantially as will hereinafter more fully appear from the following particular description, and all as set forth in and comprehended by the subjoined claims.

Referring to the accompanying drawings, forming part of this specification, Figure 1 is a side elevation of an apparatus for confining a horse while being worked upon, constructed under and in accordance with various features of this invention. Fig. 2 is a vertical cross-sectional view as seen rearward of the plane indicated by the line $xx$, Fig. 1. Figs. 3 and 4 are respectively plan views, closed and open, of the clamps and carrying-bars therefor, forming part of the shank or ankle confining means. Figs. 5 and 6 are respectively face and edge views, of guideway and rack-bars, which are vertically applied and secured upon the main supporting structure of this improved apparatus. Fig. 7 is substantially a side elevation of the fore or hind quarter confining appliance, Fig. 8 being a front view or view taken at right angles to Fig. 7, illustrating a half of the same. Figs. 9 and 10 are face and edge views of a portion of the band forming part of one of quarter-confining contrivances with an engaging-hook thereon.

In the drawings, A A represent portions of the main supporting structure, which is rigid and immovable, consisting of a suitable foundation or base-piece $a$, posts or risers $a'$, and upper horizontal string-pieces, beams, or girders $a''$, the whole being suitably braced and united in any well-known or approved manner.

B represents a supplemental or secondary frame consisting of suitable side upright posts $b$, suitably transversely united and movable longitudinally on the main frame A, the said secondary frame having the runners $c\ c$ at top and bottom, which slide over the ways $c'\ c'$.

Secondary frame B has at one or both of its sides, preferably both, a horizontal rigid bar $d$, provided with a stud $d'$. Alongside of each of said bars $d$ is an upright lever $e$, fulcrumed on the main frame at its lower end, said lever being slotted, as at $e'$, and embracing the said stud. An intermediate portion of each of said levers $e$ has its swinging motion alongside of a curved rack-bar $f$, which is bolted to the main frame, and pawls $f'$ are pivoted on and carried by the lever and take into the teeth of the said rack. One of said pawls projects forwardly from the lever $e$, while the other one extends rearwardly therefrom. On desiring to project the frame B forwardly the forward pawl $f'$ is lifted out of engagement with the rack, when the swinging of the lever, which is then free to move, will through the arm $d$ forwardly force the secondary frame, the rearmost pawl dragging along over the rack-teeth behind the lever. Of course on desiring to move the frame B rearwardly the rearward pawl $f'$ is lifted, then permitting the lever to be rearwardly swung.

The movable or secondary frame B supports confining appliances for engaging and encircling the fore quarters or portion of the horse, the position of said confining parts being indicated at D in Fig. 1. Another confining appliance, in many respects similar to the one D, and both of which will be hereinafter more particularly described, is provided and supported on the main frame A for the hind quarters or portion of the horse, and is indicated at E in the drawings, Figs. 1 and 2.

The parts for the support and confinement at the fore quarters consist of a saddle $g$, a breast-strap $h$ and a girth or encircling-strap $i$, which passes from the saddle around and under the body of the horse just back of his forward legs, the breast-strap also being connected by its terminals to the said saddle $g$, and the breast-strap $h$ and the strap $i$ are, by their ends or portions otherwise than the ends, as may be desired, suitably adapted or equipped, so as to be opened for insuring the disposition of the said supporting and encircling parts about the fore quarters of the horse. The embracing and confining means for the hind quarters also consist of a saddle part $g$ and a breeching-strap $h'$, suitably connected therewith by hooking or buckling and adapted to be disposed about the haunches of the horse, as will be made sufficiently clear on reference to Fig. 1 and also to Fig. 2. The saddle parts $g$ are made of padded and more or less flexible materials, as will be dictated by the judgment of the constructor, and the encircling straps or bands and the form of buckling or securing devices, whereby they are connected to and disconnected from the saddles preparatory to and after the confinement of a horse are not deemed necessarily to be herein described, it being obvious and essential that all of the equipments last mentioned shall be very strong and durable.

The hind-quarter-confining parts are supported from the posts or standards $a'$ $a'$ of the main structure A, as will be clearly and sufficiently made plain on reference to Fig. 2, in connection with the description next following, it being here observed that the appliances D for the fore quarters are supported and carried by mechanism which is merely a duplicate of that provided for said hind-quarter-confining parts, but which, however, are sustained and movable on the posts or uprights $b$ of the movable frame B. So, referring to Fig. 2, it will be seen that the ends of the saddle $g$ are supported upon the lower extremities of the lower arms $j$ of the pair of tong-like levers intermediately and pivotally supported at $k$ on the horizontal transverse beam C. The upper pair of arms $l$ $l$ have attached thereto rods, cords, or other mediums of connection $l'$ $l'$, which are also connected to the springs $l''$ $l''$, which are fixed at their outer ends to the said beam C. These springs exert their reaction through the connections described upon the tong-like levers to force them open so far as concerns the lower arms $j$ $j$, which support the saddle $g$. Devices are provided for maintaining the arms $j$ $j$ in their more or less nearly-approached relations to accord with the portions of the animal's body according as the same to be fitted by the saddle are larger or wider, and these devices consist of catch-pawls $m$, pivotally hung on the arms $l$ $l$ and which by their hooked points take into the ratchet-bars $m'$ $m'$. A simple contrivance for releasing the pawls $m$ from engagement with the ratchet-racks, whereby the springs $l''$ may insure the distension of the saddle-supporting levers $j$, consists in a rod $n$, vertically movable and spring-supported on the beam C between the arms $l$ $l$, together with lever-rods $o$ $o$, by their inner ends connected to a cross-head of the draw-rod $n$ and by their outer ends bearing under the pawls $m$ $m$, and said rods $o$ $o$, being intermediately fulcrumed at $o'$, and acting as levers, so that as the rod $n$ is drawn down against the supporting-spring therefor the points of the pawls $m$ $m$ will be pried out from engagement with the racks.

The beam C is guided on vertical ways $q$ on the uprights $a'a'$ of the main frame A, which guideways are, as indicated in Figs. 5 and 6, also rack-bars, the rack portions thereof being also indicated at $q'$ in Fig. 2. The said beam, with the horse-holding appliances and coacting devices that are supported thereon, is counterbalanced by the weights $r$ $r$, which are sustained on the flexible connections $r'$, guided over the sheave $r''$—that is, supported on the main frame—and which flexible connections are attached to the said beam C in a manner such as indicated at $r'''$ or otherwise, as expedient.

$s$ $s$ represent spring-pressed latch bars or bolts horizontally guided on the ends of the beam C, and by their outer extremities adapted to engage with the vertical racks $q'$ $q'$. A lever $t$, pivoted on the beam C, has an engagement with one of said latch-bolts and has an extended arm opposite from the handle-arm $t'$, to which is connected a line or rod $t''$, which crosses over and has an engagement with the latch-bolt at the other side of the beam C. On desiring to raise or lower the beam C, as becomes necessary in the use of the apparatus, the same is freed to be moved by swinging the lever $t$ against the reaction of the springs applied on the latches with which said lever is engaged.

Regarding the duplicate appliances provided for engaging and encircling, respectively, the hind and the fore quarters of the animal, and which have been particularly described in detail as to those for the hind quarters and the corresponding parts of those for the fore quarters similarly lettered in the drawings, it will be observed, and so as to obviate all doubt as to those for the fore quarters, that they also embrace a beam exactly corresponding to the beam C of those of the hind quarters, and that said beam is counterbalanced by weights $r$ $r$, and also it is otherwise all arranged and adapted the same in every respect as the beam C. In view of this similarity and of notice thereof, as above, it has not been deemed necessary to make a view to show specially said beam of the appliances for the fore quarters, as in all other particulars the view would be but practically a duplication of Fig. 2.

F represents a girth or belly-band supported intermediately from the main frame. One end of this girth is supported upon a pending rope $u$, which, by its upper portion, is secured to a ring-bolt fastened to the top of the main frame, while the other end of the girth is supported upon the pending end of a strong rope $u'$, which passes over a sheave $u''$, suitably supported on the main frame, said latter-named rope thence passing to an accessible place relative to the frame and provided with suitable confining or belaying devices not deemed necessary to herein particularly describe, inasmuch as it will be manifest that on freeing the sheave-guided rope the girth may be rendered higher or lower and adapted to lie upon or under the animal with a greater or lesser tension, as required.

Further holders are provided, so that after securing the proper confinement of the animal as to its body, the hind legs may be confined, and, as shown in Figs. 1 and 2, they principally consist of the stout arms G, of iron or other metal or durable material, one at each side of the main frame and each provided at its upper end with a transverse stud $w$, which is journaled in suitable bearings on the main frame, so that the arms may swing forward and backward. The arm at the free extremity has an apertured hub, through which the angularly-extended bars $G'$ are transversely and adjustably supported. By loosening the set-screw $v$ the said bars $G'$ may be more or less inwardly extended, and these bars carry at their inner ends clamp-jaws $v'$, the one of each pair being movable to open and close upon the other being pivotally connected to the bar, so that the clamp may be caused to receive the shank or hock of the horse. The clamp-jaws are confined closed by the sliding rings $v''$. Each bar about its center of rocking motion is provided with a sector or circular rack, as elected and substantially as indicated in edge view in Fig. 2, and a pawl $w'''$, that is pivoted on the frame, has an engagement with the rack $w'$.

By swinging up the arm G after the limb of the animal has been clamped the foot or hoof may be presented and confined in the most convenient position to be shod or otherwise treated or operated upon. As auxiliaries to the latter-described holding parts of the apparatus there may be employed further confining means, as shown at the rear portion of Fig. 1, and they may consist of an encircling-strap H to embrace the ham, and stay or brace ropes therefor suitably connected thereto, and which being sheave-supported and guided by their intermediate portions are by their terminals adapted to be drawn to the required tension and provided with belaying means, as practicable. Another strap or boot J may be used at or near the shank or ankle, and that in turn is also suitably stayed, guyed, or braced. While these latter braces or holders may for some uses be deemed as substitutes for the arm-carried foot-clamps it is intended usually to equip the apparatus in addition to the clamp-holders carried by said arms.

The part of the structure substantially supporting the girth F may be adjustably moved longitudinally of the main frame, so that the disposition of the said girth may be intermediate of the holding parts D and E described as most convenient. This provision is not essential, but is simple, and in some instances will be found very convenient.

What I claim as my invention is—

1. In an apparatus for confining horses while being worked upon, the combination, with a suitable supporting frame or structure, of a pair of arms pivotally mounted and suitably separated and adapted to be moved to open and close from and upon each other, and carrying at their extremities appliances for encircling the animal as to a suitable portion of his body and said arms being vertically adjustable on the support therefor, substantially for the purpose set forth.

2. In an apparatus for confining horses while being worked upon, a suitable supporting frame or structure, a pair of arms pivotally mounted and suitably separated and adapted to be moved to open and close the one from and upon the other and carrying at their extremities appliances for encircling the animal as to a suitable portion of his body, combined with devices for confining said arms in their adjusted relations, the one with the other, for the purpose set forth.

3. In an apparatus for confining horses while being worked upon, the combination, with a suitable supporting frame or structure having the rack-bars $m'$ $m'$, of a pair of intermediately-pivoted tong-like levers carrying at the extremities of one of the pair of arms thereof appliances for encircling the body of the animal, springs applied to the other pair of the lever-arms, reacting to maintain the arms carrying the encircling appliances distended, and pawls mounted on arms of said levers for engagement with said rack-bars and for maintaining said carrying-arms in their approached or contracted relations, for the purpose set forth.

4. In an apparatus for the purpose set forth, the combination, with a structure having appliances for the confinement of a portion of the animal to be worked upon, of a second frame movable on said structure and also equipped with confining appliances, a lever suitably fulcrumed and having an engagement with said frame, and devices for confining the lever against being swung, for the purpose set forth.

5. The combination, with a main structure having appliances for the confinement of a portion of the animal to be worked upon, of a second frame movable on said structure and also equipped with confining appliances, a lever fulcrumed on said structure and having an engagement with said frame, a pair of pawls on the lever, and a rack with which said pawls engage, for the purpose set forth.

6. In an apparatus for confining animals while being worked upon, the combination, with the main structure having horizontal ways thereon and the curved rack, of the secondary frame comprising the arm $d$ and stud $d'$, and the lever pivoted on said main structure and provided with the slot through which the said stud passes, substantially as described and shown.

7. In an apparatus for confining horses while being worked upon, the combination, with a suitable frame or structure having the rack-bars, a pair of intermediately-pivoted tong-like levers carrying at the extremities of one of the pair of arms a band for encircling the body of the animal, springs applied to the other pair of the lever-arms, reacting to maintain the arms carrying the encircling band distended, pawls mounted on one of the pair of lever-arms for engagement with said rack-bars and for maintaining said carrying-arms in their approached relations, lever-rods $o$ $o$, engaging said pawls suitably fulcrumed, and a spring-pressed hand-rod to which said lever-rods are connected, substantially as and for the purposes set forth.

8. In an apparatus for confining an animal to be worked upon, the combination, with a frame or structure in two parts lengthwise adjustable as to each other and having appliances supported on each part adapted to confine the animal by its body and at its opposite end portions, of a band or strap to encircle and confine the ham of the animal, a tackle supported and guided on said structure, and means connecting said tackle to said ham-strap, substantially as described, for the purposes specified.

In testimony whereof I have hereunto set my hand in the presence of two subscribing witnesses.

M. A. CROSSMAN.

Witnesses:
ALBERT W. BROWN,
FRANCES M. BROWN.